Feb. 21, 1928.
J. M. BROPHY
1,660,118
DOG OPERATING MECHANISM AND KNEE CUSHION FOR SAWMILL CARRIAGES
Filed Jan. 23, 1926     4 Sheets-Sheet 1
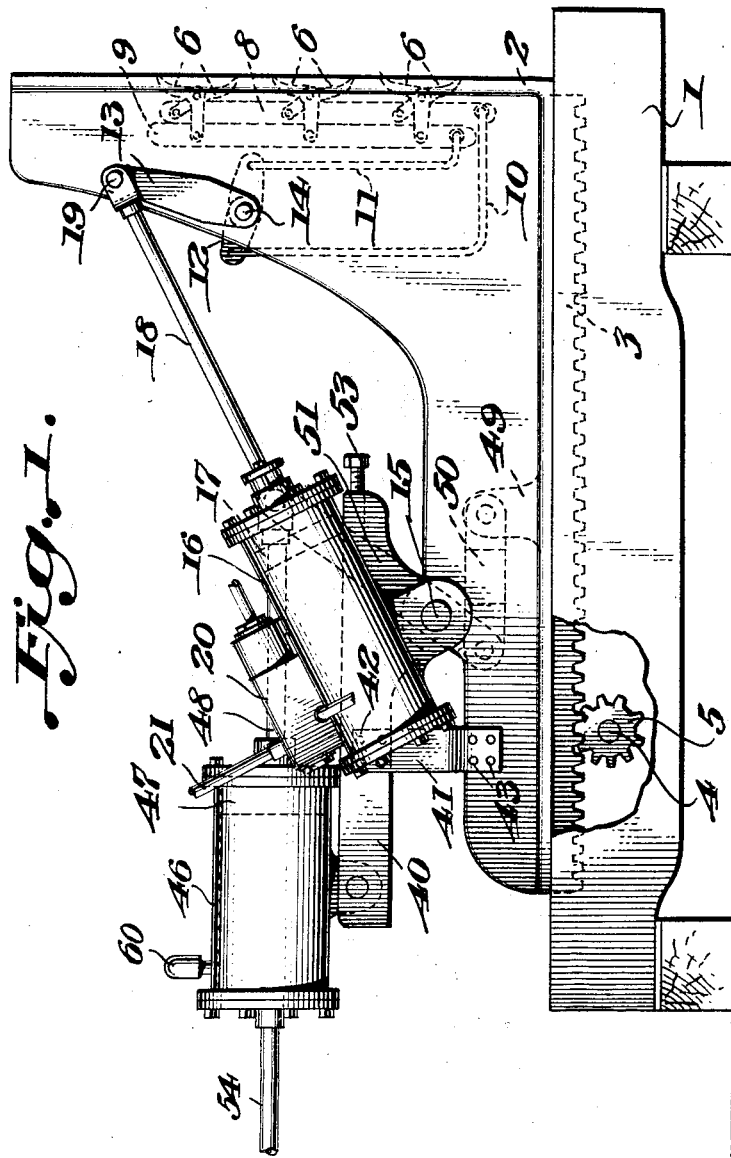

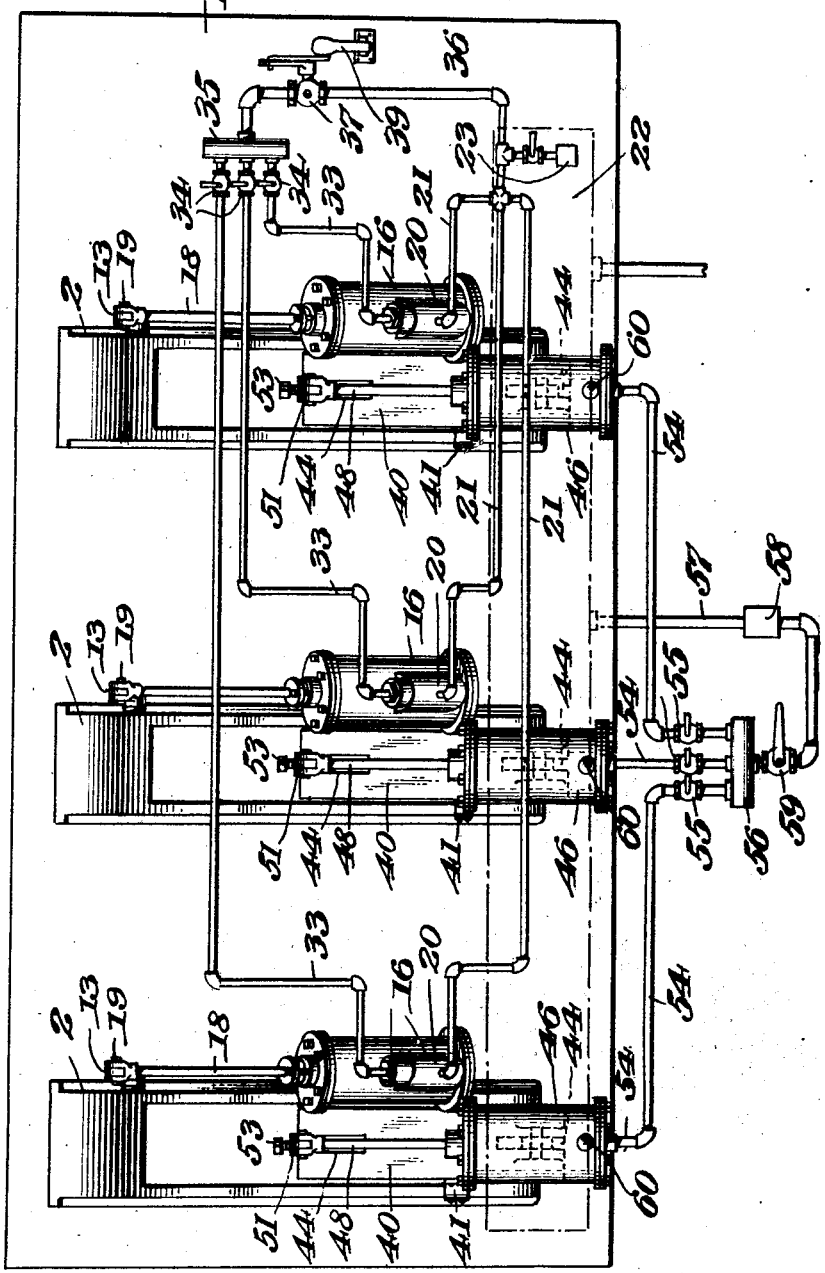

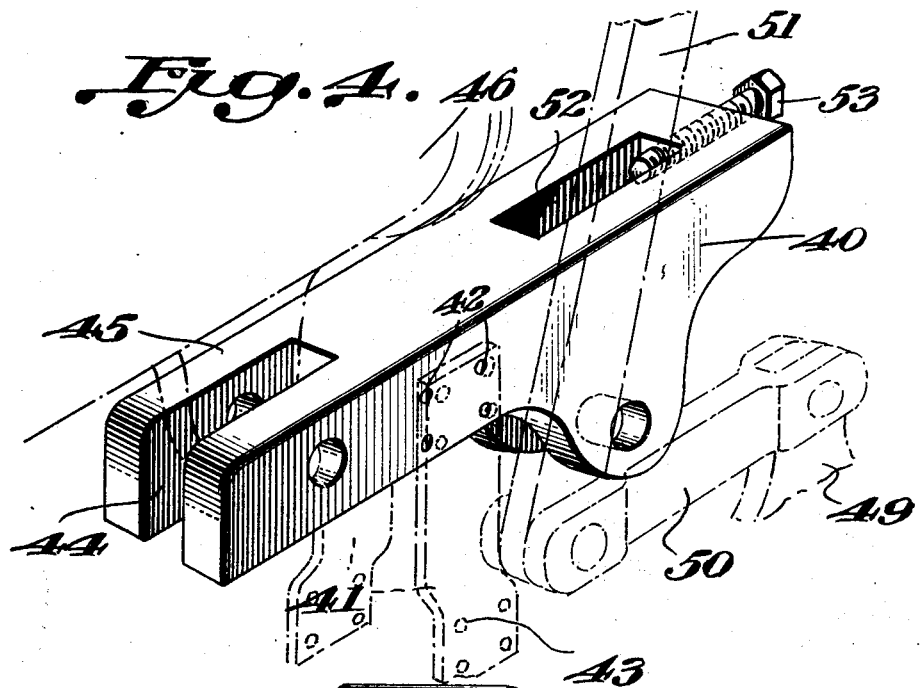
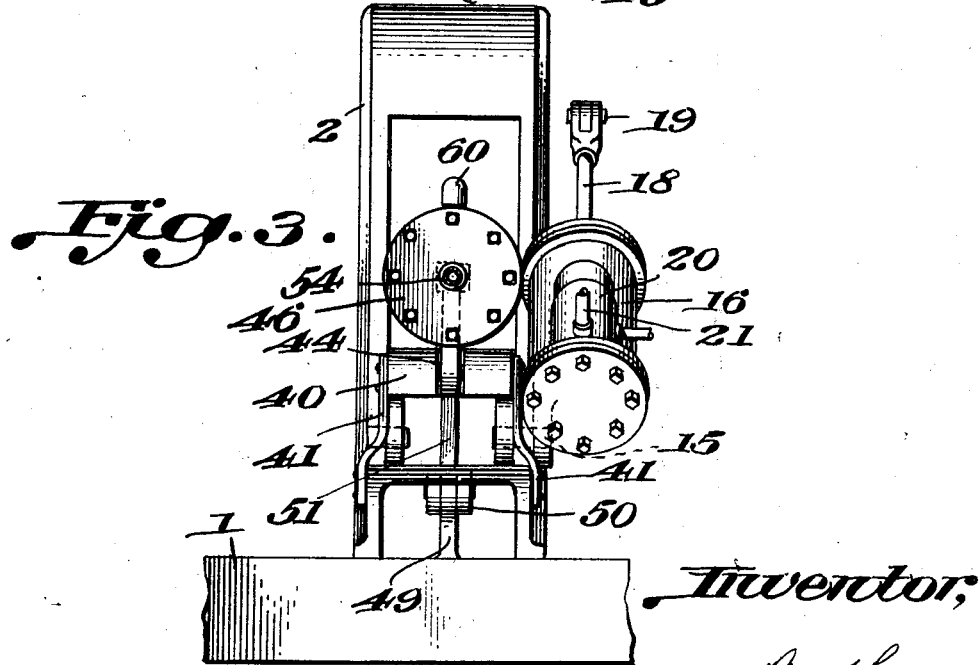

Feb. 21, 1928.
J. M. BROPHY
1,660,118
DOG OPERATING MECHANISM AND KNEE CUSHION FOR SAWMILL CARRIAGES
Filed Jan. 23, 1926  4 Sheets-Sheet 4
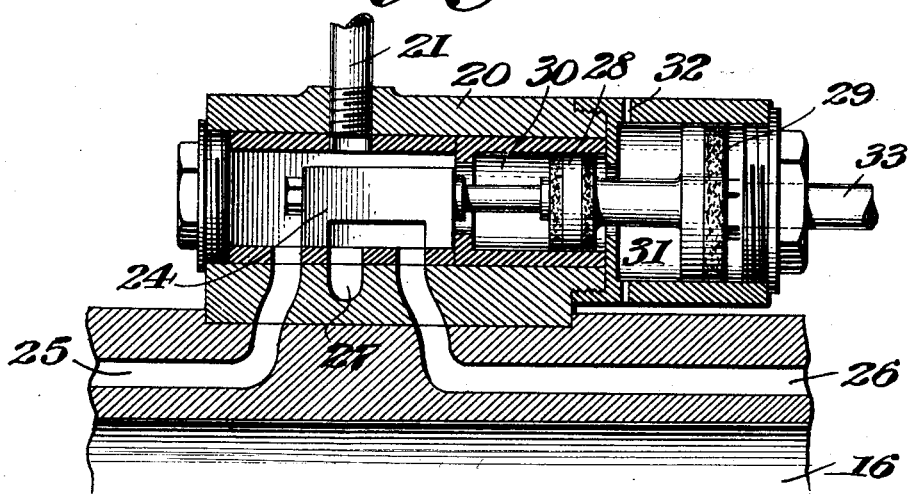
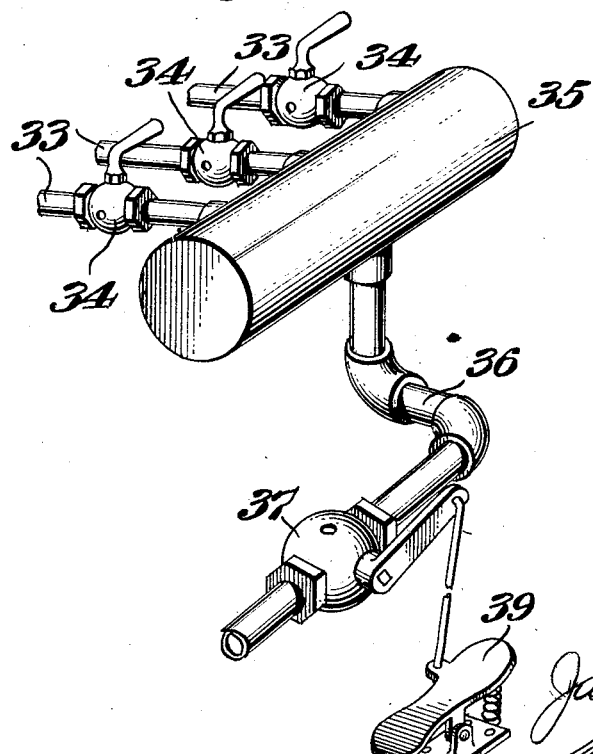
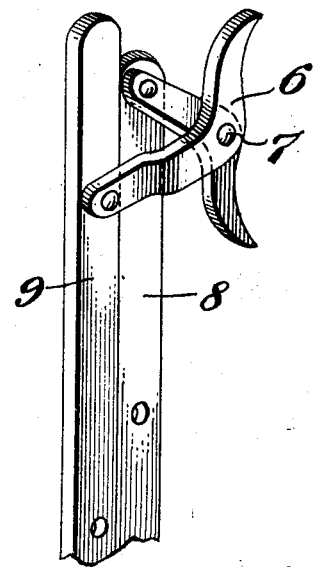

Patented Feb. 21, 1928.

1,660,118

UNITED STATES PATENT OFFICE.

JAMES M. BROPHY, OF HATTIESBURG, MISSISSIPPI.

DOG-OPERATING MECHANISM AND KNEE CUSHION FOR SAWMILL CARRIAGES.

Application filed January 23, 1926. Serial No. 83,247.

My invention relates to saw-mill carriages and, more particularly, to means for operating the grab or boss dogs which are carried by the saw-mill knees and to means for cushioning the knees.

In respect to the dog operating mechanism, one of the objects of the invention is to provide an improved motive fluid operated mechanism embodying a piston and a cylinder and a novel controlling valve whereby the grab or boss dogs are held normally released or retracted from the log by the action of any suitable motive fluid pressure such as steam or air, subject, however, to selective or simultaneous control and operation, at the will of the operator, by the utilization of manually operated valves and a master valve to the end that the grab dogs of any knee may be operated independently of those of the other knees, or all may be simultaneously operated and at any desired motive fluid pressure.

In practical operation, the dog operating mechanism of my invention, while selectively controlled at the will of the operator as between the dogs of the different knees of the saw-mill, nevertheless results in a full stroke projection or operation of the grab or boss dogs which the setter elects to operate.

The mechanism provides independent manually operated valves which control the operation of the dog operating mechanisms of the different knees.

If the setter decides that the log requires the operation of only the grab dogs on certain knees, he sets the control valves only for those knees.

When he operates the master valve, the motive fluid pressure, air for instance, derived from a suitable source, reduced by a reducing valve to the pressure desired or which is best suited to the timber being handled by the mill, immediately has access to the automatic valves which control the pistons and cylinders of the knees which are selected, and the dogs of those knees then operate. On exhausting the air pressure by turning the individual control valves to the exhaust position, the normal air pressure to which the valves of the mechanisms are subject, immediately causes restoration of the pistons thereof, to normal position and this results in release or retraction of the grab dogs of said knees. Furthermore, the setter can instantly project or retract the grab dogs of any knee without disturbing the released or projected condition of the grab dogs of other knees, and thus dog the log as he may find necessary.

My improvements in the dog operating mechanism results in simplicity of construction, ease of installation, economy of operation, as the air pressure required need be only sufficient to fill the cylinder for the dogs which have been selected, inasmuch as the pressure begins and ends at the improved automatic slide valve of the selected cylinder.

There is a minimum of piping of air lines required, which conserves the air pressure and causes the valves to operate quickly.

The control valves for the dog operating means of the respective knees and the master valve of my invention are ordinary three-way valves whose use is readily understood by any practical saw mill man.

The pistons and cylinders are of ordinary construction, but are provided with my improved automatic control valves. These can be readily installed, be economically maintained and are of such simple construction that any practical saw mill man can understand them.

Only a small amount of space is required for the installation of the operator's controlling valves and as they can be placed in front of him, he is never required to turn his head to operate the valves and thereby possibly miss signals given to him by the sawyer. Furthermore, the controls do not interfere with the quick departure of the setter in case of accident, as when the saw breaks or the carriage becomes unmanageable. The pressure reducing valve which constitutes a part of my invention affords a means whereby the air pressure which is utilized to operate the dogs may be regulated at will, according to the timber being handled, resulting in a very great saving of power.

When small logs are being sawed, the pressure can be reduced correspondingly which saves wear and tear and conserves pressure.

When valuable timber is being sawed the pressure can be regulated because the dogs penetrate the face of the timber only deep enough to enable the piece being held in position, thus obviating unnecessary dog-marks. With soft timber, the pressure can be reduced to much less than when hard timber is being handled by the mill, thereby holding the timber up to a higher average grade than is possible with air-operated dogging devices which, due to their construction and mode of control and operation, must cause the dogs to penetrate the timber to a certain depth before the dogging action finishes its stroke.

The common practice heretofore has been to provide springs to cushion the knees to take care of the shock to which they are subject by the impact of the logs. Such cushioning has not been adequate for the purpose as it has been found in practice that the cushioning effect needed varies with the size of the log and, for the further reason, because the steam log turners and impact of the logs results in slack and wear of the set works and shearing or loosening of the keys which secure the pinions on the set shaft. In fact, the hand levers which are commonly used in the set works become dangerous because their latches are liable to give way. Obviously, a cushion which is set to take care of the shock incident to handling a large log, will be too stiff to properly cushion a smaller log, and vice versa.

My improved knee cushion comprises a piston and cylinder with a linkage connected to the rack of said knee, a manually controlled valve and pipe line leading to each of the cylinders for the cushions of the different knees, and a pressure reducing valve by which the desired pressure of the air or other motive fluid may be had so that the cushioning effect may be varied in the different cylinders according to requirements. The independent valves for the cushioning cylinders enable the setter to admit or let off pressure from any cylinder as he may find necessary.

In the cushioning means is included an adjustable stop to limit the travel of the lever comprising part of the operating linkage. The mounting for the cushioning means is so arranged that said cushioning means may be readily placed on the knee of a saw-mill carriage already in use. My grab dog mechanism is also constructed to be readily placed on knees of carriages already in use.

Three-way valves are used as the individual and master controls hereinbefore referred to, said valves permitting the motive fluid pressure to be exhausted when it is desired to have the pistons return to their normal position.

The controls for handling the dog operating mechanism and the knee cushion mechanism of my invention are simple, compact, easily installed, and arranged so that they may be located conveniently to the setter whose duties require him to occupy the control seat on the carriage.

I am aware that modifications may be resorted to in carrying out the invention and while I have illustrated in the accompanying drawings and, hereinafter described, a practical embodiment of the dog operating mechanism and the knee cushion mechanism, it is to be understood that other embodiments of the inventive principles may be used.

In the accompanying drawings:

Figure 1 is a side elevation showing so much of a saw-mill carriage, one of its knees and grab dogs as will illustrate the adaptation of my improvements thereof which are shown in said figure;

Figure 2 is a plan view, more or less diagrammatic, showing a saw-mill carriage having three knees equipped with my improvements, the controls for the dog operating mechanism and knee cushioning mechanisms being shown at different points for the sake of clearness of illustration, whereas in practice they are arranged conveniently to the setter who occupies the seat on the carriage;

Figure 3 is a detail rear elevation of one of the knees, showing my improvements applied thereto;

Figure 4 is a detail perspective of a part of the cushion mechanism;

Figure 5 is a detail longitudinal section of the automatic valve;

Figure 6 is a detail perspective of the controls for the dog operating mechanism; and Figure 7 is a detail view of a pair of the grab dogs and their slides.

The saw-mill carriage is designated generally as 1, and the knees appear at 2, said knees being slidably mounted and, also, adjustable, in the usual manner, by racks 3 of which one is shown, Figure 1. The said shaft 4 carries pinions of which one is shown at 5.

Any grab or boss dogs may be used in connection with my invention, a common form of dog appearing in Figures 1 and 7. These dogs 6 are arranged in pairs, pivoted together at 7, and respectively pivoted to slides 8, 9, which are connected by operating connections 10, 11 to a head 12 which is rocked by a rocker 13 mounted on a shaft 14.

Pivotally mounted at 15 on the knee 2 is a cylinder 16 in which is a piston 17 having a piston rod 18 pivoted at 19 to the rocker 13. Normally, the piston 17 is at the upper or forward end of the cylinder 16 at which point it is held by air pressure or any motive fluid pressure employed, such pressure entering a controlling valve cylinder or chest 20 through a pipe 21 which connects with a motive fluid pressure, or air, tank 22 after passing through a pressure reducing valve 23. The pressure reducing valve 23 is adapted to be set, as desired, to maintain such a pressure of the air or motive fluid delivered through pipes 21 to the different cylinders 16 as may be desired.

As previously explained, this reducing valve enables pressure to be reduced when small logs, soft timber or valuable timber is being handled or to be increased when hard wood is being dogged, thus enabling the dogging action to be economically and satisfactorily carried on at all times.

I provide a novel automatic valve for controlling the supply of motive fluid pressure to one side or the other of the piston 17, as shown in Figure 5. The valve chest 20 contains a slide valve 24 which is adapted to put either port 25 or port 26 in communication with the cylinder 16 and to exhaust, through the exhaust port 27 the pressure so that there will be no opposition to the movement of the piston when the pressure is changed from one side to the other side thereof. The slide valve 24 is connected to a small piston valve 28 and a larger piston valve 29 operating in cylinders 30, 31, the latter having a relief port 32. Normally, there is constant motive fluid pressure entering the valve chest from the pipe 21, this pressure causing the valve to be maintained in the position shown in Figure 5, whereby the pressure has access to the cylinder 16 through the port 25, thus maintaining the piston 17 as shown in Figure 1 and the dogs 6 in their retracted or released position. When, however, pressure is admitted through the pipe 33, under the control hereinafter described, the superior or greater superficial area of the piston valve 29 enables such pressure to shift the piston valves and the slide valve to the left, Figure 5, thus exhausting the air from cylinder 16 through port 25 and exhaust port 27 and admitting the pressure from pipe 21 through port 26 to the opposite side of the piston 17, whereupon the piston 17 is instantly moved to the left hand end of the cylinder 16. When this occurs, the rocker 13 shifts the slides 8 and 9 and causes the grab dogs 6 to be operated for the purpose of dogging the log.

Each knee has mechanism such as previously described, there being control valves such as shown in Figure 5 for each cylinder 16. Each control valve has its own pipe 33. In each pipe 33 is a manually operable three-way controlling valve 34 which enables the setter to admit or exhaust the pressure to the different valves that control the cylinders 16 and to do so whenever desired as well as to exert an independent control over each controlling valve.

The three-way valves 34 are connected to a header 35 which communicates with the motive fluid pressure tank 22 by a pipe 36 in which is a master valve 37 and the pressure reducing valve 23. The master valve 37 is a three way valve and it is controlled either by a treadle 39, as shown in Figures 2 and 6, or in any other manner.

The pressure reducing valve 23 enables any desired adjustment to be had to determine the pressure which will be fed to the pipe 36 and pipes 33 and 21 so that the desired regulation of action may be obtained, as explained heretofore.

Normally, as previously explained, the pressure entering the valve chest 20 through the pipe 21 shifts the valve pistons 28, 29, to the right, Figure 5, because there is no opposing pressure entering through the pipes 33 as the master valve 37 is normally closed and is only opened on manually operating it. Therefore, the pistons 17 are all in the position shown in Figure 1 which results in the grab dogs 6 being in released or retracted position as shown by dotted lines in Figure 1.

The valves 34 and 37 will be arranged conveniently for operation in front of the setter who occupies a seat on the carriage. He can open any one or more of the valves 34 or close them as he may desire so that having conditioned these valves 34 to cause the dogs 6 of any knee to be potentially set for operation, when he operates the valve 37, the pressure immediately flows from pipe 36 into the pipe or pipes 33 whose valves 34 have been opened. The pressure which has access to the piston valve 29 at any knee, immediately causes the slide valve 24 to be shifted to the left, Figure 5, to cut off the pressure from the left hand side of the piston 17 and to admit the pressure to the right hand side thereof whereupon the piston projects the dogs 6 for the purpose of dogging the log.

On turning any valve 34 to the exhaust position, the pressure is exhausted from pipe 33 and the piston 17 then returns to its normal position. Thus, the setter has absolute control at all times over the dogs of any knee independently of the dogs of every other knee, or, he may simultaneously operate the dogs of two or more knees to project or release them.

When it is desired to release the dogs of all the knees simultaneously, this can be done by operating the valve 37 to an exhausting position.

The cushioning means is carried by a casting 40 which is also mounted on the pin 15 and is located in the hollow of the knee at the pivotal point, thence rising above the knee and being immovably anchored to the knee by plates 41 which are bolted at 42 to the casting and at 43 to the knee. If preferred, the casting 40 could have downwardly projecting ears to take the place of the plates 41. The casting 40 enables the cushion mechanism to be applied to any of the knees commonly used at the present time on saw-mill carriages, without interfering with the use of the dog operating mechanism hereinbefore described.

Mounted in the bifurcated part 44 of the casting 40 is the ear 45 of the cushion cylinder 46. Within the cylinder 46 is a piston 47 having a piston rod 48. Connected to an ear 49 which is attached to the rack 3, is a link 50 which, in turn, is connected by a link 51 to the piston rod 48. The link 51 is adapted to move in a slot 52 in the casting 40 and its play is limited by a screw 53 carried by the casting 40. By adjusting the screw 53, the extent of play of the piston 47 may be changed as desired.

Normally, the piston 47 is held in the position shown in Figure 1, or in other position according to the adjustment of screw 53, by motive fluid pressure admitted to the cylinder 46 through pipe 54. There is a separate pipe 54 for each of the cylinders 46 and a separate cylinder 46, and links 50, 51 for each knee. Each pipe 54 is provided with a manually operated three-way valve 55 so that the pressure to each cylinder 46 may be controlled independently of the control of pressure to each of the remaining cylinders 46. The pipes 54 are connected to a header 56 which, in turn, is connected to tank 22 by a pipe 57. A pressure reducing valve 58 is located in the pipe 57 so that the pressure which may be fed to the cylinders 46 can be regulated as desired. Obviously, the cushioning action needed will have to be lighter at times and at other times heavier, according to the size of the log. The pressure reducing valve 58 enables the setter to change his pressure according to the log being handled. A master valve 59 is provided in the pipe 57.

The controlling valves are located conveniently to the setter so that he can change the pressure and open and close said valves at will.

While my cushioning mechanism tends to destroy the taper effect upon the log, such taper effect may be partly obtained after the log has been loaded on the carriage, because the setter can release the air from the cylinder 46 as the steam log turner places the log in the desired position to be dogged, inasmuch as the log turner will then push back a knee from which the pressure has been released so that the log may be positioned in any desired manner.

After the log has been partly sawed and has one flat side, the air is again applied to the cushion cylinder 46 to push the log to normal position. It will be seen that with the use of the cylinders 46 and the pistons 47, the motive fluid pressure constitutes the sole means for holding the knees to the sawing line and as it is necessary for all of the knees to be lined up, this can be accomplished by adjusting all of the set screws 53.

Suitable relief valves 60 are provided for the cylinders 46 to let off pressure above any desired amount.

The valve 59 can be used to simultaneously control the pressure in the cylinders 46, and they can be independently controlled by the valves 55.

What I claim is:

1. In a dog operating mechanism for saw mill carriages, the combination with motive fluid pressure operated means for actuating and releasing the dogging means, automatic means controlling the motive fluid pressure operated means to normally cause said motive fluid pressure operated means to maintain the dogging means in released condition, and manually operable means for controlling the operation of said motive fluid pressure operated means through control of said automatic means, whereby the operator may cause the dogs to be actuated.

2. In a dog operating mechanism for saw mill carriages, the combination with dogging means for the different knees of the carriage, of independent motive fluid pressure operated means for actuating and releasing the dogging means of the different knees, automatic means in each instance controlling the respective motive fluid pressure operated means aforesaid to normally maintain the dogging means in released condition and independent manually operable means for independently controlling the operation of the respective motive fluid pressure operated means through independent control of said automatic means at the will of the operator, whereby the dogging means of each knee may be actuated or released as desired independently of the actuation or release of the dogging means of the other knees.

3. In a dog operating mechanism for saw mill carriages, the combination with dogging means for the different knees of the carriage, of independent motive fluid pressure operated means for actuating and releasing the dogging means of the different knees, automatic means in each instance controlling the respective motive fluid pressure operated means aforesaid to normally maintain the dogging means in released condition, independent manually operable means for independently controlling the operation of the respective motive fluid pressure operated means through independent control of said automatic means at the will of the operator, whereby the dogging means of each knee may be actuated or released as desired independently of the actuation or release of the dogging means of the other knees, and a master controlling means adapted for operation at the will of the operator adapted to render the automatic means effective to project or retract the dogs of any knee whose independent manually operable controlling means has been set for control by said master controlling means, said independent controlling means being adapted for operation to restore the dogs of its knee to released position independently of the control exercised by the master controlling means.

4. In a dog operating mechanism for saw mill carriages, the combination with dogging means for the different knees of the carriage, of independent motive fluid pressure operated means for actuating and releasing the dogging means of the different knees, independent manually operable means for independently controlling the operation of the respective motive fluid pressure operated means at the will of the operator, whereby the dogging means of each knee may be actuated or released as desired independently of the actuation or release of the dogging means of the other knees, a master controlling means adapted for operation at the will of the operator, the control of the independent manually operable means being subject to the control by said master controlling means, and motive fluid pressure reducing means which may be arranged to determine the degree of pressure exerted by the motive fluid which is under the control of the master controlling means.

5. In a dog operating mechanism for saw mill carriages, the combination with dogging means, of motive fluid pressure operated means for actuating and releasing said dogging means, an automatic motive fluid pressure operated valve controlling the admission of motive fluid pressure to the aforesaid means, said valve normally being actuated by the motive fluid pressure to admit the motive fluid pressure to the aforesaid means in a manner causing the dogging means to normally remain in released position, and manually operable means for controlling the admission of motive fluid pressure to said valve at the will of the operator for the purpose of shifting the valve to operate the motive fluid pressure operated means to change its normal condition for the purpose of actuating the dogging means.

6. In a dog operating mechanism for saw mill carriages, the combination with dogging means, of a piston and cylinder for actuating and releasing said dogging means, an automatic motive fluid pressure operated valve controlling the admission of motive fluid pressure to different parts of the cylinder, said valve embodying pistons of different effective pressure areas, the piston of smaller area normally being actuated by the motive fluid pressure to admit the motive fluid pressure to the cylinder in a manner causing the release of the dogging means, and manually operable means for controlling the admission of motive fluid pressure to the piston of greater effective area of said valve at the will of the operator for the purpose of shifting the valve to admit the pressure to another part of the cylinder to cause movement of the piston from its normal position for the purpose of actuating the dogging means.

In testimony whereof I affix my signature.

JAMES M. BROPHY.